(No Model.) 4 Sheets—Sheet 2.
W. R. BAKER.
SHEAF CARRIER.
No. 419,623. Patented Jan. 21, 1890.
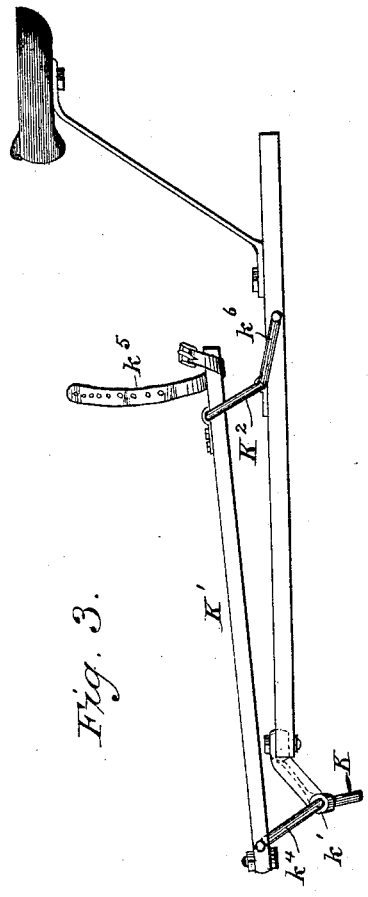
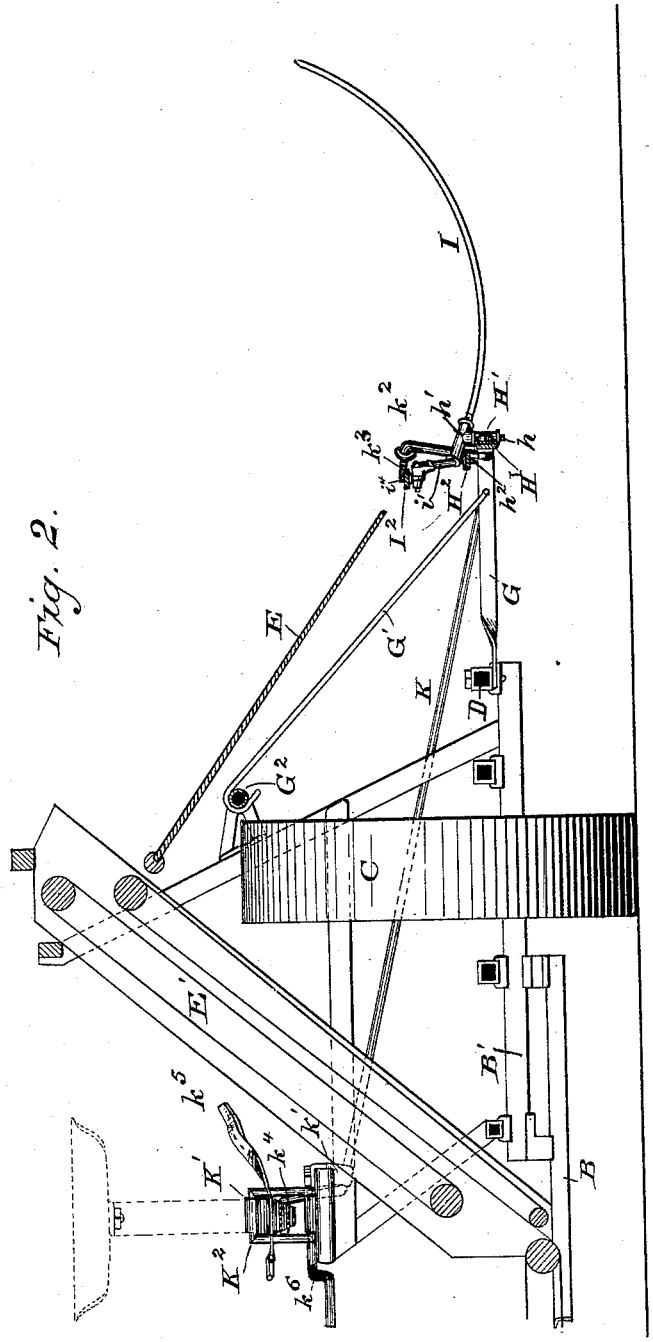
Witnesses
Wm A. Skinkle
Chas. E. Gorton
Inventor
William R. Baker
By his Attorneys
Parkinson & Parkinson (No Model.) 4 Sheets—Sheet 3.
W. R. BAKER.
SHEAF CARRIER.

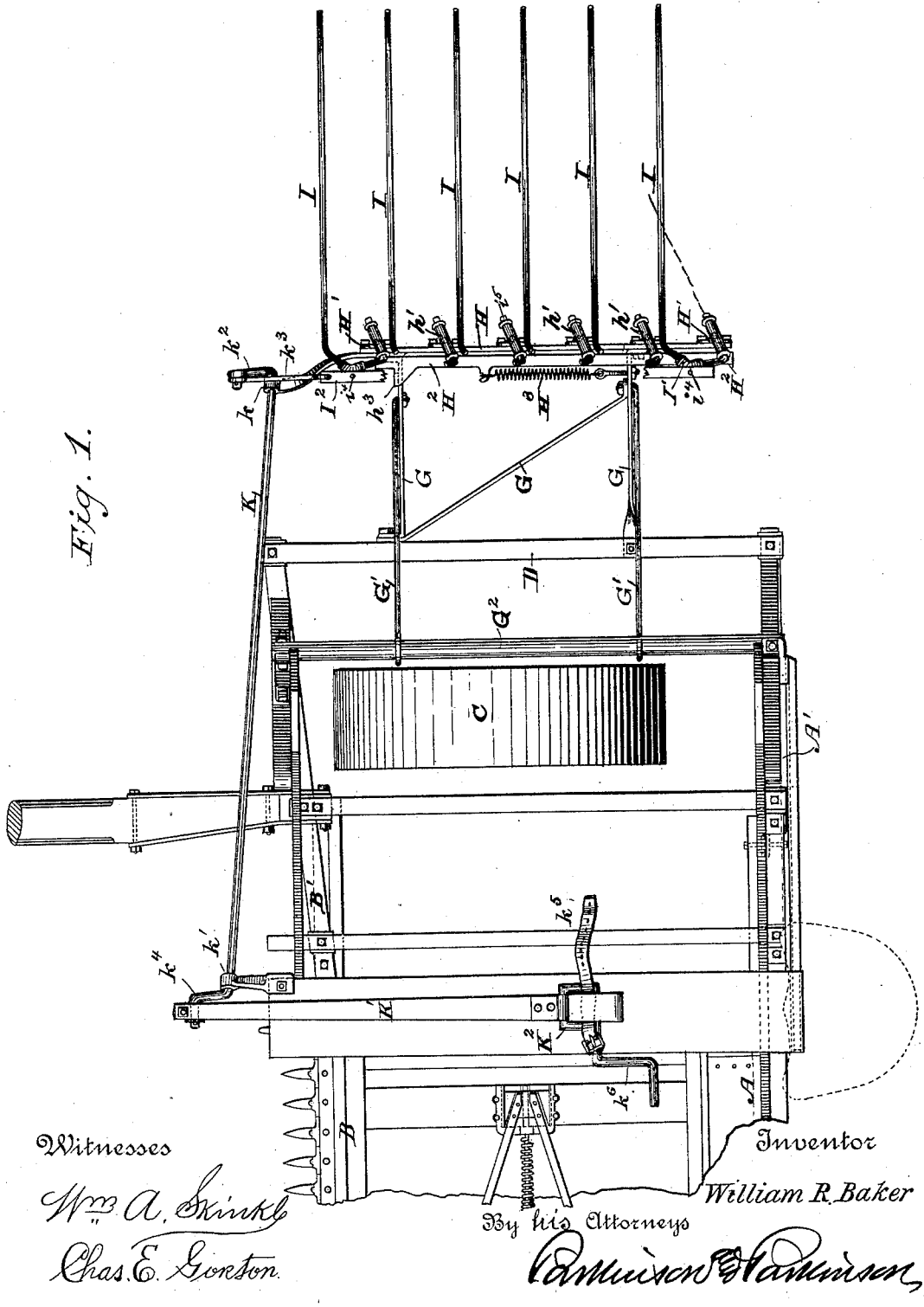

No. 419,623. Patented Jan. 21, 1890.

Witnesses
Wm. A. Skinkle
Chas. E. Gonton

Inventor
William R. Baker
By his Attorneys
Robinson & Parkinson (No Model.) 4 Sheets—Sheet 4.

W. R. BAKER.
SHEAF CARRIER.

No. 419,623. Patented Jan. 21, 1890.

Witnesses
Wm. A. Skinkle
Chas. E. Gorton

Inventor
William R. Baker
By his Attorneys
Parkinson & Parkinson

UNITED STATES PATENT OFFICE.

WILLIAM R. BAKER, OF CHICAGO, ILLINOIS, ASSIGNOR TO THE McCORMICK HARVESTING MACHINE COMPANY, OF SAME PLACE.

SHEAF-CARRIER.

SPECIFICATION forming part of Letters Patent No. 419,623, dated January 21, 1890.

Application filed September 15, 1888. Serial No. 285,497. (No model.)

*To all whom it may concern:*

Be it known that I, WILLIAM R. BAKER, a citizen of the United States, resideng at Chicago, in the county of Cook and State of Illinois, have invented certain new and useful Improvements in Sheaf-Carriers for Grain-Binders, of which the following is a specification.

My invention consists in the combination, to form a sheaf-carrier, of a series of curved fingers normally arranged at right angles to the line of advance of the machine with their curved ends upstanding, individual pivotal bearings for each finger trending horizontally and transversely to said line of advance, and an operating device common to each of said fingers, whereby they may be rocked in said bearings to lay them over flatwise with their curved outer ends pointing to the rear; in combining with such series of curved fingers and their bearings trending horizontally and transverse to the advance of the machine supporting-pivots for said bearings arranged vertically, or thereabout, a controlling-rod connected with said pivots, so as to cause them to move in unison, and a spring connected with said controlling-rod and with the frame and holding the said pivots normally in position to retain the carrier-fingers in place for receiving their load, whereby they will be permitted to yield rearwardly against the stress of the spring when meeting an obstruction or when passing through a narrow gate and will be returned to their receiving position immediately after being relieved from the obstruction.

It consists, further, in the various combinations and details of construction hereinafter described.

Figure 4:
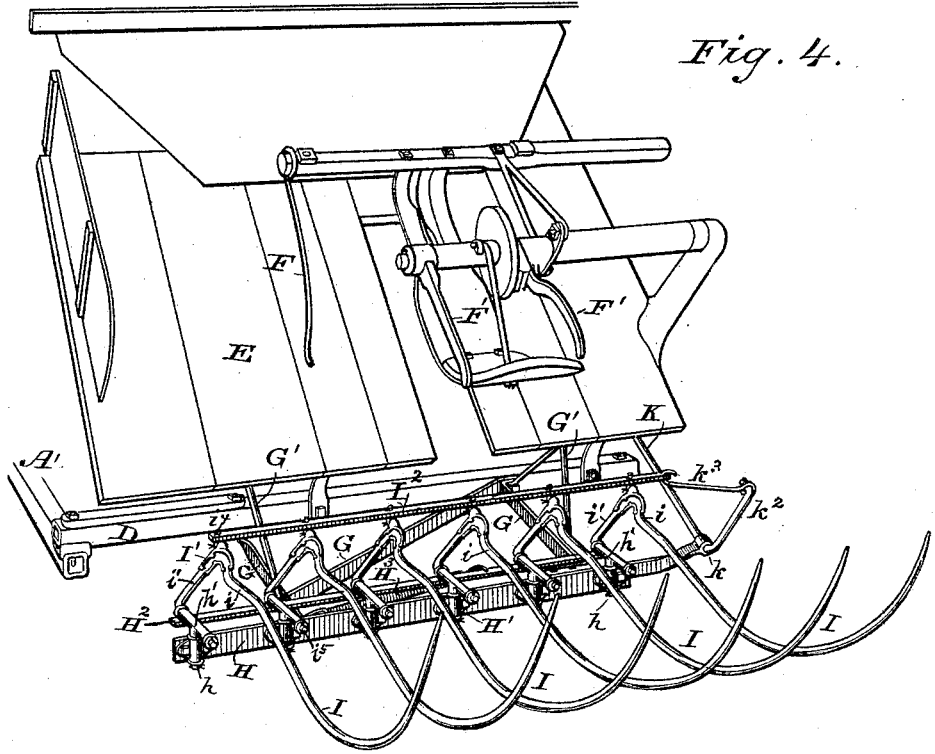
Figure 5:
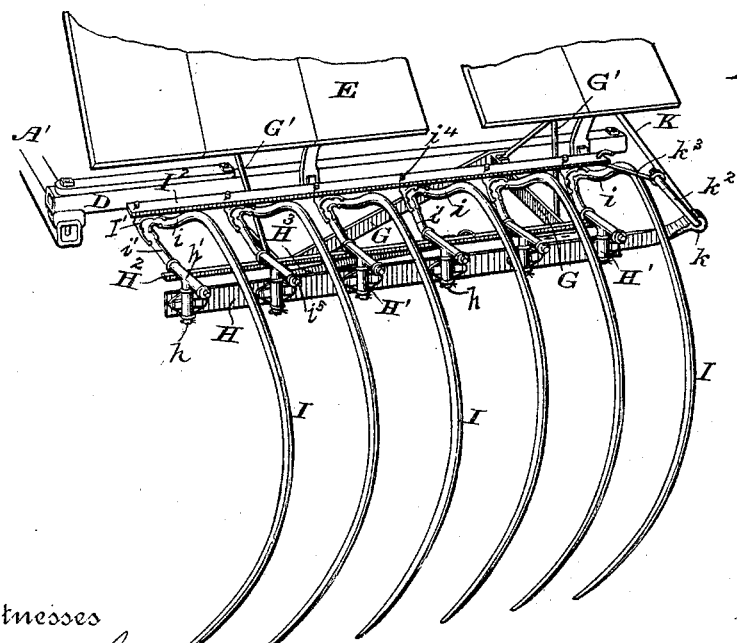
Figure 6:
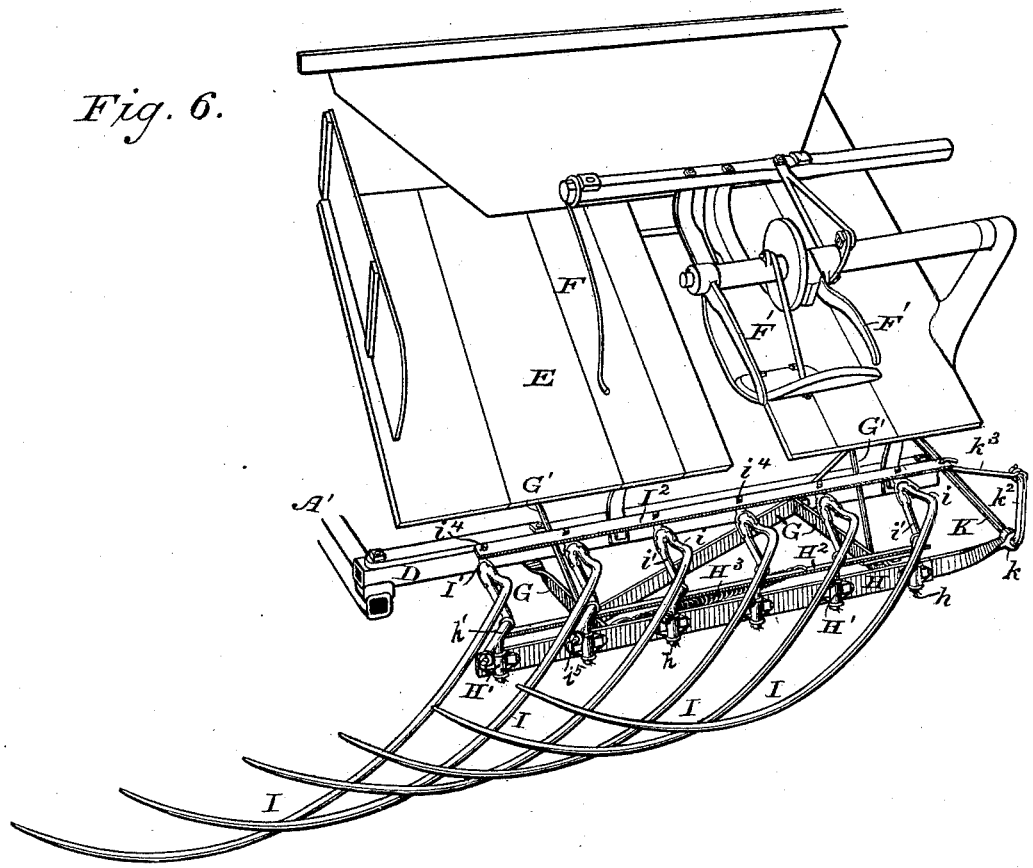
Figure 7:
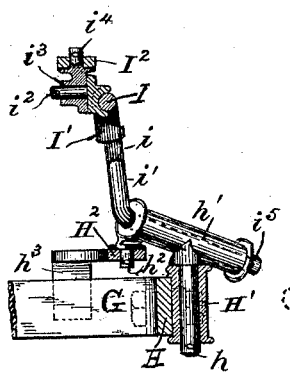
Figure 8:
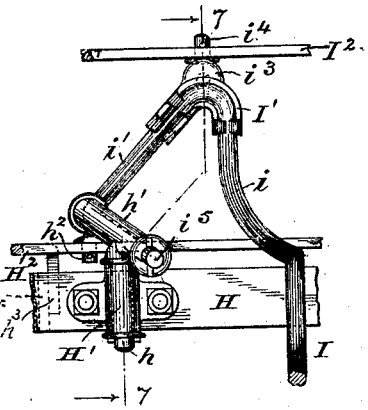
Figure 9:
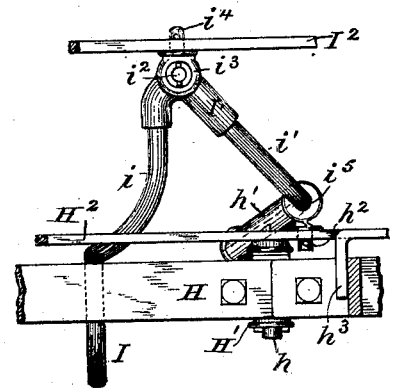

In the drawings, Figure 1 is a top plan view of so much of a harvester-frame, with a carrier embodying my improvements applied thereto, as is necessary to a full understanding of said invention. Fig. 2 is a rear elevation, partly in section, of said harvester-frame and carrier, showing also the elevator-frame and grain-deck. Fig. 3 is an enlarged detail of the seat, seat-plank, and foot-bar for operating the carrier from the driver's seat, showing also a portion of the bell-crank by which motion is communicated from the foot-bar to the carrier. Fig. 4 is a perspective view of said carrier, comprising also a portion of the harvester-frame, grain-deck, and sheaf-ejector, and with the carrier-fingers in their receiving position. Fig. 5 is also a perspective view of said carrier with the fingers rocked into their discharging position; Fig. 6, a third perspective view showing the carrier-fingers still standing as if for the purpose of receiving, but bent back upon the vertical pivots against the stress of the spring for the purpose of passing obstructions; and Figs. 7, 8, and 9 are enlarged details of the fingers, their bearings, their vertical supporting-pivots, and controlling-bars, the first partly in section and seen from the rear, the second seen from the outer side, and the third from the inner side.

A represents the rear platform-sill, and A' the rear elevator-sill; B, the front platform-sill and finger-bar, and B' the front elevator-sill of a harvester, these sills, except the front platform-sill, being herein shown as formed of square pipes, as are also the cross-girts of the elevator-frame, this form being selected only as an exponent of any suitable construction.

C is the main wheel, and D the outer-girt. E represents the grain-deck or binding table receiving from the elevator E', F the spring retaining-fingers over the grain-deck, and F' the ejector-arms secured to the tyer-shaft, as usual in modern grain-binders. Automatic binding mechanism will of course be located over and beneath the grain-deck to be operated from this tyer-shaft or other suitable source; but I have not deemed it necessary to show any in the drawings.

Brackets G are bolted to the outside girt D and project therefrom a sufficient distance, being further supported near their outer ends by means of brace-rods G', hooked upon a bar or gas-pipe G², carried upon the outside elevator-struts at some height above the wheel-frame, and this pipe may be one of the supports for the binding attachment. To the outer ends of these brackets is secured a strong bar H parallel with the outside girt or with the line of the advance of the machine, and with its face perpendicular, or nearly so, to the ground. The brackets and the bar which they support are in the present construction intended to be of metal, but may of course be of wood, to less advantage, however.

The bar H, which may hereinafter be termed the "carrier-frame bar" or "supporting-bar," has secured to its face at suitable intervals a number of vertical or nearly vertical bearing-boxes H', each receiving a pivot $h$, carrying at its top or having formed integral with itself an inclined pivotal bearing $h'$ for the carrier-fingers, from the upper end of which bearing depends a short pintle $h^2$, taking into a controlling-rod H², which runs parallel with the carrier-frame bar inside of it. This rod is formed with a depending lug $h^3$, which comes against one of the supporting-brackets or other suitable stop whenever the inclined bearings have been brought into their normal position that the carrier may receive from the binder, and it is held against said bracket or stop by means of a coiled or other spring H³, secured at one end to the rod and at the other to one of the supporting-brackets or other part of the fixed frame-work. Whenever, however, the rod is acted upon in a direction to carry its lug away from the bracket, the bearings $h'$, with which it is connected, will be swung with it in unison on their vertical pivots, so that their outer ends will point to the rear, thus also swinging the carrier-fingers to the rear, or, conversely, whenever either of the carrier-fingers is acted upon by meeting an obstruction, or otherwise, so as to tend to be swung to the rear, these bearings $h'$, in which they rest, swing upon their vertical pivots $h$, carrying at the same time their controlling-rod H² to the front against the stress of its spring H³, and as soon as the fingers have passed the obstruction the spring draws the rod back until its lug comes in contact with the stop, thus restoring the fingers to their receiving position.

I represents the carrier-fingers, shown in their normal receiving position in Figs. 1, 2, and 4, in their discharging position in Fig. 5, and merely swung back to pass an obstruction in Fig. 6. These fingers are curved or bellied beneath the horizontal plane of their bearings to form a pocket for the reception of the sheaves, but at their inner ends or shanks are bent or cranked upwardly and slightly to the rear, as at $i$, and then obliquely downward and to the rear, as at $i'$, receiving in the angle thus formed a saddle I', which may represent any suitable rigid attachment to the finger at or adjacent to said angle. From the saddle projects a short pintle $i^2$, entering a bearing $i^3$, formed integral with another pintle $i^4$, entering an operating-bar I², common to all the carrier-fingers. At the foot of the rearward and obliquely-downward bend of the shank or inner end the finger is again bent outwardly, downwardly, and slightly to the front to form a pivot $i^5$, entering the inclined bearings, and the axis of which advisably intersects the body of its finger about midway of its length or about the bottom of the curve, so that the load shall balance, this point of intersection being a neutral point.

It follows from the bent shank, from the inclined position of the pivotal bearings, the weight of the fingers themselves and of the sheaves as they accumulate, and the curved or bellying outline of the fingers that the latter will at all times, when left to themselves, be practically locked in position and against accidental dumping, so that the load will be carried until purposely discharged by the driver. Such discharge is effected by means of the bell-crank K, mounted at its lower and outer end in a bearing $k$, supported from the carrier-frame bar and at its upper end in another bearing $k'$ from the seat-plank or elevator-frame, and having at said lower end a crank $k^2$, connected by a link $k^3$ with the operating-bar I² of the carrier, and at its upper or inner end a second crank $k^4$, journaled in the forward end of a foot-bar K', which runs rearwardly over the seat-plank, has a bearing upon the upper bar of the stirrup K², pivoted to the seat-plank, and is provided in rear of said stirrup with a foot-strap $k^5$, so that it may be pushed forward or drawn back by the foot, the first movement serving to bring the carrier-fingers into their receiving position and the second to rock them on their inclined bearings without, however, giving them any swinging movement, but merely laying them over by a rocking movement, the plane of their length sloping toward the stubble and their curves pointing to the rear, as in Fig. 5, when the load will be discharged, and immediately thereafter the fingers will be restored to their normal position by pushing upon the foot-bar by the action of the spring upon the controlling-bar and by their own weight. If desired, a crank $k^6$ may be added to the stirrup alongside the inner edge of the seat-plank and projecting rearwardly and provided with a foot-piece, so that the driver may use his unemployed foot to assist the other in dumping.

The swinging bearings are shown as inclined at an angle of about thirty degrees; but their inclination will depend somewhat upon the normal height of the frame-bar above the ground and also upon judgment. It will be sufficient to say that they may range between the horizontal and a somewhat greater inclination than that shown in the drawings, but that I have found that as the inclination is diminished from the angle shown the labor of dumping is materially increased.

It will be understood that the dumping operation to discharge a load of sheaves is entirely independent of and distinct from the swinging movement. Whenever the carrier-fingers meet an obstruction, the latter simply brings them parallel one with the other, moves them upon their vertical pivots, and swings the inclined bearings to the rear, but does not drop the fingers along their length, while in the dumping movement the fingers are simply rocked and laid over practically parallel with each other with their curves pointing to the rear, but without bodily movement to the rear and without swinging them at all upon their vertical pivots, unless they should at that moment meet an obstruction, when they will of course yield to the obstruction, as before described, in order to pass it.

I do not confine myself to the precise construction of the carrier-fingers and other mechanism herein described, as it is evident that various changes in structure, outline, and arrangement may be made without departing from the spirit of my invention; but

What I claim as my invention is—

1. The combination, in a sheaf-carrier, of a series of curved fingers normally upstanding at their outer ends and having their inner ends or shanks cranked and provided beyond the cranks with pivots returning upon the body of the finger, horizontally-trending bearings for said pivots, an operating-bar connected with the crank of each finger, and a lever to actuate said bar.

2. The combination, substantially as hereinbefore set forth, in a sheaf-carrier, of a series of curved fingers normally parallel with the line of reception and with their curves in vertical planes, pivots upon said fingers arranged with their axes intercepting the body at about the center or slightly beyond the bottom of the curve, independent bearings on the supporting-frame for said pivots, and a common operating device whereby said fingers are rocked or rolled in their bearings to lay their curves over flatwise.

3. The combination, substantially as hereinbefore set forth, in a sheaf-carrier, of a series of curved fingers normally parallel with the line of reception and with their curves in upstanding planes, horizontally-trending pivots for said fingers, a common operating device to rock them on said pivots, and upstanding pivots on which said bearings are carried.

4. The combination, substantially as hereinbefore set forth, in a sheaf-carrier, of a series of curved fingers normally parallel with the line of reception and with their curved ends upstanding, primary horizontally-trending bearings for said fingers, a common operating device to rock them in said bearings, upstanding pivots on which said bearings are carried, and a controlling-rod connected to each of said pivots to cause them to move in unison.

5. The combination, substantially as hereinbefore set forth, in a sheaf-carrier, of a series of curved fingers normally parallel with the line of reception and with their curved ends upstanding, horizontally-trending bearings for said fingers, a common operating device to rock the fingers in said bearings, upstanding pivots carrying the primary pivots, a controlling rod connected to each of said pivots to cause them to move in unison, a spring urging said rod toward the normal, and a stop determining its limit of movement in that direction.

6. The combination, substantially as hereinbefore set forth, in a sheaf-carrier, of a series of curved fingers having their inner ends or shanks cranked and provided beyond the cranks with pivots returning toward the body of the finger, horizontally-trending bearings for said pivots, upright pivots carrying said bearings, an operating-bar connected with the crank of each finger, a lever to actuate said bar, and a spring-held controlling-rod connected with each of the upright pivots, whereby the fingers are rocked in their horizontally-trending bearings to lay them over flatwise and discharge the load, but independently thereof permitted to yield at any time to pass an obstruction.

WILLIAM R. BAKER.

Witnesses:
JAS. H. HASKINS,
HENRY B. UTLEY.